Aug. 18, 1953

W. L. GLEN ET AL

2,649,442

PREPARATION OF A HYPOTENSIVE AGENT
FROM VERATRUM VIRIDE

Filed Feb. 13, 1951

2 Sheets-Sheet 1

```
        ┌─────────────────────────┐
        │  GROUND ROOTS & RHIZOMES│
        │    of VERATRUM VIRIDE   │
        └───────────┬─────────────┘
                    │ ← AMMONIA SOLUTION
                    │ ← EXTRACT WITH BENZENE
                    │      SEVERAL TIMES
        ┌───────────┴─────┐          ┌────────┐
        │ BENZENE EXTRACT │──────────│  MARC  │→
        └───────┬─────────┘          └────────┘
                │ ← CONCENTRATE UNDER REDUCED
                │     PRESSURE
                │ ← STAND SEVERAL HOURS
        ┌───────┴─────────┐          ┌──────────────────┐
        │ BENZENE FILTRATE│──────────│BENZENE CRYSTALLINE│→
        └───────┬─────────┘          │    PRECIPITATE    │
                │                    └──────────────────┘
                │ ← EXTRACT WITH BUFFER SOLUTION
                │     AT pH 5.0-8.0
        ┌───────┴─────────┐          ┌──────────────┐
        │ BUFFER SOLUTION │──────────│ BENZENE PHASE│→
        └───────┬─────────┘          └──────────────┘
                │ ← WASH WITH BENZENE
        ┌───────┴─────────┐          ┌──────────────┐
        │  WASHED BUFFER  │──────────│ BENZENE WASH │→
        │    SOLUTION     │          └──────────────┘
        └───────┬─────────┘
                │ ← MAKE ALKALINE PREF. pH 9-10
                │ ← EXTRACT WITH BENZENE
        ┌───────┴─────────┐          ┌──────────────┐
        │  BENZENE PHASE  │──────────│ AQUEOUS PHASE│→
        └───────┬─────────┘          └──────────────┘
                │ ← WASH WITH H₂O
        ┌───────┴─────────┐          ┌──────────────┐
        │  BENZENE PHASE  │──────────│ AQUEOUS PHASE│→
        └───────┬─────────┘          └──────────────┘
                │ ← CONCENTRATE TO DRYNESS
        ┌───────┴─────────┐
        │HYPOTENSIVE ALKALOIDAL│
        │      ESTERS     │
        └─────────────────┘
```

Fig. 1

Inventors
William L. Glen
Gordon S. Myers
Gilles Papineau-Couture

By Dudley Browne
Attorneys

Fig. 2

Infrared Spectrum of Hypotensive Ester Alkaloids (Veratrum viride)

Patented Aug. 18, 1953

2,649,442

UNITED STATES PATENT OFFICE

2,649,442
PREPARATION OF A HYPOTENSIVE AGENT FROM VERATRUM VIRIDE

William Lawrence Glen, Baie d'Urfe, Gordon S. Myers, Ville St. Laurent, and Gilles Papineau-Couture, Montreal, Quebec, Canada, assignors to Ayerst, McKenna & Harrison, Limited, Quebec, Quebec, Canada, a corporation of Canada Application February 13, 1951, Serial No. 210,712

5 Claims. (Cl. 260—236)

1

The present invention relates to a new preparation of hypotensive alkaloidal esters and to a method for obtaining said preparation from *Veratrum viride*.

Prior art

Several procedures for the preparation of concentrates of alkaloids from *Veratrum viride* are described in the literature. A study of these procedures shows that they involve a large number of steps some of which are difficult to perform. Moreover, the products obtained contain in addition to hypotensive alkaloidal esters considerable amounts of undesirable non-ester alkaloids.

For example, powdered *Veratrum viride* is extracted with benzene in the presence of aqueous ammonia, followed by concentration of the benzene liquors and repeated extractions of the concentrate with dilute acid. The acid extract thus obtained is made alkaline and the crude mixture of alkaloidal bases thus liberated is extracted into benzene. In practice, this procedure has been found to be non-selective in the separation of the desired hypotensive alkaloidal esters from the undesired alkaloids, and intractable emulsions are often encountered. Further, these emulsions frequently necessitate prolonged exposure to an alkaline medium with concomitant hydrolysis of the desired alkaloidal esters. The product obtained by this procedure contains such undesirable non-ester alkaloids as veratramine, rubijervine, isorubijervine and jervine.

A concentrate may also be prepared from *Veratrum viride* by extracting the powdered drug with benzene in the presence of aqueous ammonia, removing from the benzene extract the benzene-crystallizable alkaloids and extracting the resultant benzene solution with dilute acid. The dilute acid extract is made alkaline and extracted with benzene, the benzene extract is concentrated and the residue taken up in acetic acid and treated with ammonium sulphate, the relatively insoluble sulphates of jervine and veratramine separate and are removed by filtration. The aqueous filtrate is made alkaline and extracted with benzene and the benzene extract concentrated. The concentrate thus obtained is the benzene-soluble amorphous alkaloidal fraction. It is substantially free of benzene-insoluble materials and of benzene-crystallizable alkaloids, but still contains rubijervine and isorubijervine and varying amounts of jervine and veratramine together with hypotensive alkaloidal esters.

Applicants' development

In accordance with the present invention, there

2 is now provided a simple process by which there is obtained a new preparation of hypotensive alkaloidal esters of *Veratrum viride* substantially free from the undesired alkaloids, jervine, veratramine, rubijervine and isorubijervine.

The process of the present invention greatly reduces the number of steps and minimizes destruction of the desired labile hypotensive alkaloidal esters by avoiding prolonged exposure to an alkaline medium; in addition troublesome emulsions have not been encountered. Surprisingly the method has been found selective in that it separates all of the desired hypotensive alkaloidal esters from undesired alkaloids and other inert materials in a single buffer extraction step.

The present invention will be more fully understood by referring to the accompanying drawings in which Figure 1 illustrates in flow sheet form the preferred steps of the present invention, and Figure 2 shows characteristic absorption bands of the new preparation of the present invention in the range of 890 cm.$^{-1}$ to 1320 cm.$^{-1}$ The powdered drug (*Veratrum viride*, roots and rhizomes) is treated with aqueous ammonia and extracted several times with benzene. The benzene-insoluble marc is discarded and the combined benzene extract is concentrated under reduced pressure, preferably to about one twentieth of its volume and any crystalline precipitate which forms is removed. The benzene filtrate is extracted repeatedly with a buffer solution at a pH within the range of from about 5 to about 8, preferably a 2 molar acetate buffer solution at pH 5.5.

Surprisingly the acetate buffer solution preferentially extracts the active hypotensive alkaloidal esters while substantially all the undesired alkaloids such as jervine, veratramine, rubijervine and isorubijervine remain in the benzene phase.

The buffer extracts are combined and washed several times with benzene, the combined washed buffer solution is then made alkaline at a pH not higher than 10, preferably a pH of about 9.6 and the desired hypotensive alkaloidal esters are extracted into benzene. The combined benzene extracts are washed with water, dried and concentrated to dryness under reduced pressure to obtain the desired preparation of hypotensive alkaloidal esters. This preparation is substantially free from rubijervine, isorubijervine, jervine and veratramine.

The preparation is highly effective in reducing blood pressure and is an effective agent clinically in the treatment of hypertension. The product is freely soluble in benzene and in dilute acetic acid. The infrared absorption spectrum of a mineral oil suspension of the hypotensive agent of the present invention in the region of wave numbers between 1320 cm.$^{-1}$ to 890 cm.$^{-1}$ is shown in Figure 2 of the accompanying drawings.

EXAMPLE

The process for obtaining the new preparation of the present invention will be further illustrated by referring to the following example.

A mixture of 100 lbs. of *Veratrum viride* (ground roots and rhizomes) 160 litres of benzene, 23 litres of water and 2.3 litres of ammonia (sp. gr. 0.9) is stirred at room temperature for 24 hours. At the end of this period the benzene is removed by filtration and the residual material stirred with a fresh portion of 120 litres of benzene for a further 24 hours. The benzene extract is removed by filtration as before and the solid residue is extracted once more with 120 litres of benzene. The exhausted residue is discarded and the combined benzene extracts are concentrated under reduced pressure to a volume of 15–20 litres and left in the refrigerator for several hours. The inert crystalline material which separates is removed and the filtered benzene liquors extracted four times with 4×7.5 litres of a 2 molar acetate buffer at pH 5.5 by agitating in a suitable container. The benzene phase is discarded (or reserved for further working) and the combined aqueous buffer extracts are washed four times with benzene (4×7.5 litres) and the benzene washes discarded (or conserved for future working).

The buffer phase is made alkaline with aqueous ammonia (cooling throughout the process, and avoiding excess of alkali; the final pH is about 9.6), then extracted four times with benzene (4×5 litres). The combined benzene extracts are washed with water (2×300 cc.), dried over sodium sulphate and concentrated to dryness under reduced pressure to give the desired product.

This preparation is a highly active hypotensive agent effective on oral administration.

One such preparation when suspended in solid form in mineral oil exhibited characteristic absorption bands in the infrared region of the spectrum at the following frequencies expressed in reciprocal centimeters: 3380, 1738, 1635, 1290, 1245, 1205, 1176, 1152, 1115, 1052, 1024, 974, 950, 924, 900.

The sample did not give a precipitate when tested for rubijervine and isorubijervine according to the test described by Craig and Jacobs, J. Biol. Chem. 149, 451 (1943); further it contained no jervine or veratramine detectable by the precipitation methods described by Jacobs et al., J. Biol. Chem. 160, 555 (1945).

One such preparation when injected intravenously into anaesthesized dogs over a period of 10 minutes in doses of 0.1γ per kilogram of body weight caused a substantial fall in blood pressure.

We claim:
1. In a process for obtaining the hypotensive alkaloidal esters from *Veratrum viride*, comprising the steps of repeatedly extracting roots and rhizomes of *Veratrum viride* with benzene in the presence of ammonium hydroxide, concentrating the combined benzene extracts and discarding any crystalline precipitate formed, extracting the benzene filtrate with a buffer solution having a pH within the range of from about 5.0 to about 8.0 thereby transferring a major portion of the desired hypotensive alkaloidal esters into the buffer solution, washing said buffer solution with benzene, adjusting the pH of the washed buffer solution to within the range of from about 9 to about 10 and extracting said solution with benzene, washing the benzene phase with water and concentrating the washed benzene phase to dryness under reduced pressure to obtain a residue of the hypotensive active alkaloidal esters substantially free from the undesired alkaloids jervine, veratramine, rubijervine and isorubijervine.

2. The process as defined in claim 1, in which the buffer solution is an acetate buffer solution having a pH of about 5.5.

3. In a process for obtaining the hypotensive alkaloidal esters from *Veratrum viride*, the step of extracting a benzene concentrate of *Veratrum viride* with a buffer solution having a pH within the range of from about 5 to about 8 thereby transferring a major portion of the desired alkaloidal esters into the buffer solution and liberating the desired hypotensive alkaloidal esters from said buffer solution.

4. A process for selectively extracting hypotensive alkaloidal esters of *Veratrum viride* substantially free from the non-hypotensive alkaloids jervine, veratramine, rubijervine, and isorubijervine from a benzene solution containing said alkaloidal materials in admixture comprising extracting said benzene solution with an aqueous buffer solution having a pH within the range of from about 5 to about 8.

5. The process as defined in claim 4 in which the buffer solution is one having a pH of about 5.5.

WILLIAM LAWRENCE GLEN.
GORDON S. MYERS.
GILLES PAPINEAU-COUTURE.

References Cited in the file of this patent

Poethke: Scientia Pharmaceutica, vol. 9, pp. 110–111 (1938).

Viehoever et al.: J. Amer. Pharm. Assoc., vol. 11, No. 3, pp. 166–174 (1922).

Jacobs et al.: J. Biol. Chem., vol. 160, pp. 555–565 (1945).

Fried et al.: J. Am. Chem. Soc., vol. 71, pp. 3260–3261 (1949).

Fried et al.: J. Am. Chem. Soc., vol. 72, pp. 4621–4630 (October 1950).